(12) United States Patent
Ganji et al.

(10) Patent No.: US 12,180,890 B1
(45) Date of Patent: Dec. 31, 2024

(54) VARIABLE BLEED VALVE ASSEMBLIES

(71) Applicant: General Electric Company, Schenectady, NY (US)

(72) Inventors: Nageswar Rao Ganji, Bengaluru (IN); Ravindra Shankar Ganiger, Bengaluru (IN); Ambika Shivamurthy, Bengaluru (IN); Hiranya Kumar Nath, Bengaluru (IN); Trevor H. Wood, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/454,531

(22) Filed: Aug. 23, 2023

(30) Foreign Application Priority Data

Jun. 23, 2023 (IN) .............................. 202311042128

(51) Int. Cl.
*F02C 7/00* (2006.01)
*F02C 9/18* (2006.01)

(52) U.S. Cl.
CPC ................ *F02C 7/00* (2013.01); *F02C 9/18* (2013.01); *F05D 2260/96* (2013.01)

(58) Field of Classification Search
CPC .... F02C 9/18; F02C 7/00; F02C 7/045; F05D 2260/96; F05D 2260/962; F05D 2260/963; F04D 27/0207; F04D 27/0215; F04D 29/66; F04D 29/661; F04D 29/665
See application file for complete search history.

(56) References Cited

U.S. PATENT DOCUMENTS

| 3,227,241 A | 1/1966 | Mattoon |
| 3,291,420 A | 12/1966 | Laing |
| 3,638,428 A | 2/1972 | Shipley et al. |

(Continued)

FOREIGN PATENT DOCUMENTS

| DE | 1114979 B | 10/1961 |
| FR | 3129428 | 5/2023 |

(Continued)

OTHER PUBLICATIONS

Pelat et al., "The acoustic black hole: A review of theory and applications," Elsevier, Journal of Sound and Vibration, 476, 115316, Mar. 18, 2020, 24 pages.

(Continued)

*Primary Examiner* — Elton K Wong
(74) *Attorney, Agent, or Firm* — Hanley, Flight & Zimmerman, LLC

(57) ABSTRACT

Example variable bleed valve assemblies for a gas turbine engine are disclosed herein, including a port extending radially outward from a compressor section of the gas turbine engine, the port defining a variable bleed valve cavity, the port to resonate at a resonant frequency based on an operating condition of the gas turbine engine, and an acoustic suppressor positioned on a wall of the port, the acoustic suppressor extending circumferentially along the wall by a length greater than a cross-sectional width of the acoustic suppressor, the acoustic suppressor defining a resonant cavity based on the length and the cross-sectional width, the acoustic suppressor including a perforated portion, the acoustic suppressor tuned to resonate at the resonant frequency based on the length and the perforated portion.

20 Claims, 10 Drawing Sheets

(56) References Cited

U.S. PATENT DOCUMENTS

| | | | |
|---|---|---|---|
| 3,898,799 | A | 8/1975 | Pollert et al. |
| 5,123,240 | A | 6/1992 | Frost et al. |
| 6,048,171 | A | 4/2000 | Donnelly et al. |
| 6,565,313 | B2 | 5/2003 | Nikkanen et al. |
| 6,981,842 | B2 | 1/2006 | D'Angelo et al. |
| 7,017,706 | B2 | 3/2006 | Brown et al. |
| 7,249,735 | B2 | 7/2007 | Amorosi et al. |
| 8,590,308 | B2 | 11/2013 | Kirby |
| 8,683,812 | B2 | 4/2014 | Bertolotti et al. |
| 8,931,284 | B2 | 1/2015 | Hussain et al. |
| 9,175,577 | B2 | 11/2015 | Papamoschou et al. |
| 9,518,513 | B2 | 12/2016 | Pritchard, Jr. et al. |
| 9,623,354 | B2 | 4/2017 | Kumar et al. |
| 9,657,844 | B2 | 5/2017 | Hrdlichka et al. |
| 10,024,228 | B2 | 7/2018 | Gong et al. |
| 10,704,726 | B2 | 7/2020 | Lin et al. |
| 10,830,179 | B2 | 11/2020 | Hatim |
| 2002/0139900 | A1* | 10/2002 | Porte ............... B64D 15/04 244/134 C |
| 2012/0070271 | A1 | 3/2012 | Urban et al. |
| 2013/0340440 | A1* | 12/2013 | LeBlanc ............... F04D 27/023 60/785 |
| 2014/0034416 | A1* | 2/2014 | Liu ............... F04D 29/441 181/290 |
| 2020/0017189 | A1* | 1/2020 | Kruckenberg ....... G10K 11/168 |
| 2020/0232357 | A1* | 7/2020 | Bertoldi ................. F01N 1/023 |
| 2023/0228219 | A1 | 7/2023 | Zheng et al. |

FOREIGN PATENT DOCUMENTS

| | | |
|---|---|---|
| FR | 3129432 | 5/2023 |
| FR | 3130879 | 6/2023 |
| FR | 3130894 | 6/2023 |
| FR | 3132743 | 8/2023 |
| GB | 785955 A | 11/1957 |

OTHER PUBLICATIONS

Xiaoqi et al., "Broadband and low frequency sound absorption by Sonic black holes with Micro-perforated boundaries," ScienceDirect, Journal of Sound and Vibration, vol. 512, 116401, Nov. 10, 2021, 17pages.

Mousavii et al., "How the Waveguide Acoustic Black Hole Works: A Study of Possible Dampening Mechanisms," The Journal of the Acoustical Society of America. vol. 151, 4279-4290, Jun. 29, 2022, 13 pages.

Bravo et al., "Broadband Sound Attenuation and Absorption by Duct Silencers Based on the Acoustic Black Hole Effect: Simulations and Experiments," Elsvier, Journal of Sound and Vibration, May 26, 2023, 24 pages.

United States Patent and Trademark Office, "Non-Final Office Action," issued in connection with U.S. Appl. No. 17/578,062, mailed on Oct. 16, 2023, 21 pages.

United States Patent and Trademark Office, "Final Office Action," issued in connection with U.S. Appl. No. 17/578,062, mailed on Apr. 23, 2024, 25 Pages.

* cited by examiner

VARIABLE BLEED VALVE ASSEMBLIES

RELATED APPLICATION

This patent claims the benefit of Indian Provisional Patent Application No. 202311042128, which was filed on Jun. 23, 2023. Indian Provisional Patent Application No. 202311042128 is hereby incorporated herein by reference in its entirety. Priority to Indian Provisional Patent Application No. 202311042128 is hereby claimed.

FIELD OF THE DISCLOSURE

This disclosure relates generally to turbine engines and, more particularly, to variable bleed valve assemblies.

BACKGROUND

Turbine engines are some of the most widely used power generating technologies, often being utilized in aircraft and power-generation applications. A turbine engine generally includes a fan and a core arranged in flow communication with one another. The core of the turbine engine generally includes, in serial flow order, a compressor section, a combustion section, a turbine section on the same shaft as the compressor section, and an exhaust section. Typically, a casing or housing surrounds the core of the turbine engine.

Figure 1:
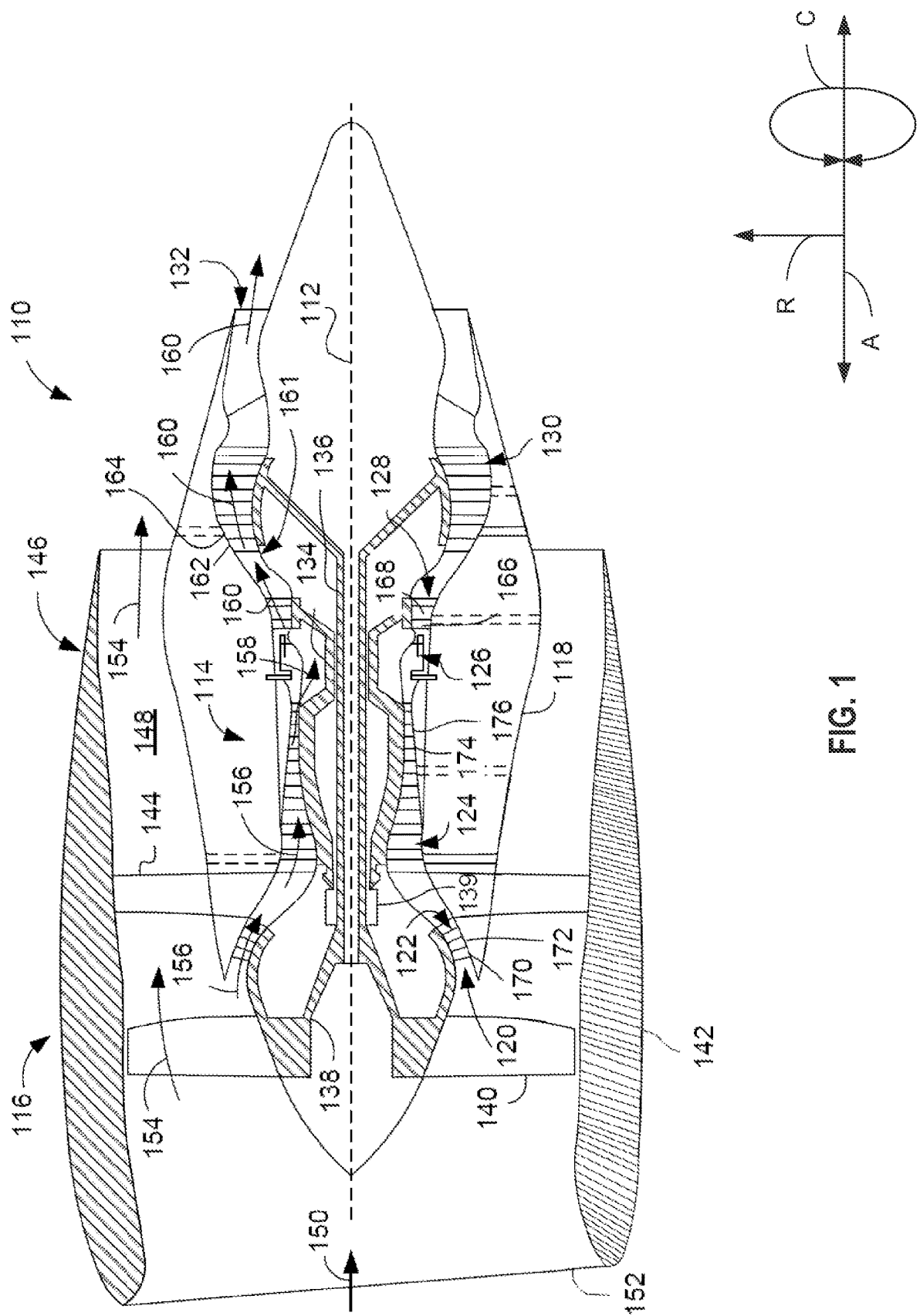
FIG. 1 is a cross-sectional view of an example gas turbine engine in which examples disclosed herein may be implemented.

The figures are not drawn to scale. Instead, the thickness of the layers or regions may be enlarged in the drawings. Although the figures show layers and regions with clean lines and boundaries, some, or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially same relationship is within three degrees of being the same, a substantially flush relationship is within three degrees of being flush, etc.).

As used herein, the terms "upstream" and "downstream" refer to locations along a fluid flow path relative to a direction of fluid flow from a first location to a second location. For example, with respect to a fluid flow, "upstream" refers to the first location from which the fluid flows, and "downstream" refers to the second location toward which the fluid flows. For example, with regard to a gas turbine engine, a compressor is said to be upstream of a turbine relative to a flow direction of air flowing through the engine.

Various terms are used herein to describe the orientation of features. In general, the attached figures are annotated with reference to the axial direction, radial direction, and circumferential direction of the vehicle associated with the features, forces, and moments. In general, the attached figures are annotated with a set of axes including the axial axis A, the radial axis R, and the circumferential axis C.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore provided to describe an exemplary implementation and not to be taken limiting on the scope of the subject matter described in this disclosure. Certain features from different aspects of the following description may be combined to form yet new aspects of the subject matter discussed below.

DETAILED DESCRIPTION

A turbine engine, also referred to herein as a gas turbine engine, is a type of internal combustion engine that uses atmospheric air as a moving fluid. In operation, atmospheric air enters the turbine engine via a fan and flows through a compressor section where one or more compressors progressively compresses (e.g., pressurizes) the air until it reaches the combustion section. In the combustion section, the pressurized air is combined with fuel and ignited to produce a high-temperature, high-pressure gas stream (e.g., hot combustion gas) before entering the turbine section. The hot combustion gases expand as they flow a through a turbine section, causing rotating blades of one or more turbines to spin. The rotating blades of the turbine produce a spool work output that powers a corresponding compressor. The spool is a combination of the compressor, a shaft, and the turbine. Turbine engines often include multiple spools, such as a high pressure spool (e.g., HP compressor, shaft, and turbine) and a low pressure spool (e.g., LP compressor, shaft, and turbine). However, a turbine engine can include one spool or more than two spools in additional or alternative examples.

During low speed operation of the turbine engine (e.g., during start-up and/or stopping), equilibrium of the engine is adjusted. In many scenarios, a delay is needed for the spool(s) to adapt (e.g., a time for a rotational speed to adjust for a new equilibrium). However, the compressor cannot stop producing pressurized air for fuel combustion during operation. Such a result may cause the turbine to stop producing the power to turn the compressor, causing the compressor itself to stop compressing air. Accordingly, throttling changes may lead to compressor instabilities, such as compressor stall and/or compressor surge. Compressor stall is a circumstance of abnormal airflow resulting from the aerodynamic stall of rotor blades within the compressor. Compressor stall causes the air flowing through the compressor to slow down or stagnate. In some cases, the disruption of air flow as the air passes through various stages of the compressor can lead to compressor surge. Compressor surge refers to a stall that results in disruption (e.g., complete disruption, majority disruption, other partial disruption, etc.) of the airflow through the compressor.

A variable bleed valve (VBV) is often integrated into a compressor (e.g., at a downstream end of the LP compressor) to increase efficiency and limit possible stalls. The VBV enables the turbine engine to bleed air from a compressor section of the turbine engine during operation. An example VBV assembly includes a VBV port (e.g., opening, air bleed slot, etc.) including a VBV cavity extending from a compressor casing and a VBV door that opens via actuation. In other words, the VBV is configured as a cavity with a door that opens to provide a bleed flow path to bleed off compressed air between a booster (e.g., a low pressure compressor) and a core engine compressor of a gas turbine. For example, the VBV door may be actuated during a speed-to-speed mismatch between the LP spool and the HP spool. During deceleration transients for example, the HP spool may spin at a lower speed than the LP spool. Opening the VBV port allows the LP spool to maintain a particular stall margin while reducing the amount of air that is flowing through the HP compressor by directing some of the air flow to the fan exhaust area. Thus, the VBV door enables the LP spool (e.g., booster) to operate on a lower operating line and further away from a potential instability or stall condition.

In some VBV ports, the VBV door is not flush with the compressor casing, resulting in a bleed cavity that is open to a main flow path within the compressor. When the VBV door is closed, air of the main flow path flows over an opening of the VBV cavity. This causes the VBV port to acoustically resonate at a fixed frequency or a set of frequencies, similar to blowing air over an empty bottle. These frequencies are commonly referred to as Rossiter tones. More specifically, a shear layer of the main flow path is formed across an opening of the VBV cavity. The shear layer has oscillations that couple with the non-flowing air within the VBV cavity. The oscillations can be amplified based on the geometry of the VBV cavity and/or acoustically excite the air in the engine core. At certain resonant frequencies, acoustic excitations cause mechanical vibrations of the rotor system (e.g., rotor blades, rotor disks, rotor blisks (integrated rotor disk and blades), etc.) in the LP compressor. In some cases, the mechanical vibrations propagate and/or intensify upstream along the rotor system toward the initial rotor disk. Such mechanical excitation of the LP compressor can damage the rotor system and/or reduce booster performance. For example, one or more rotor blades of the initial rotor stage can crack due to excessive mechanical vibrations from the acoustic resonance of a closed-off VBV port (e.g., VBV cavity). Accordingly, new VBV assemblies are needed to reduce the resonant frequencies of the VBV cavity when the VBV door is closed.

Example VBV assemblies disclosed herein dampen the acoustic response of the air within the VBV cavity to reduce the oscillations of the air within the booster. Thus, disclosed examples enable the manufacture of VBV assemblies that reduce vibration of the LP compressor or booster at various resonant frequencies of the VBV cavity. In other words, example VBV assemblies disclosed herein reduce vibrational damage imparted to a rotor system of a booster while improving aerodynamic performance and/or efficiency of a turbine engine.

Certain examples disclosed herein enable a VBV assembly in which a contoured (e.g., undulating, corrugated, etc.) surface with perforation(s) (e.g., holes, apertures, etc.) can be affixed to a wall of the VBV port to reduce the VBV cavity acoustic resonance response. Example contoured surfaces, acoustic liners, or mufflers include perforations or holes to reduce the resonant response of the closed VBV cavity. In some examples, the mufflers are incorporated into a casting process of the VBV assembly to be integrated with the VBV port as a single unified part. Additionally or alternatively, the mufflers are separate parts coupled to the walls of the VBV port. As such, the acoustic liners or resonators can be retrofit into walls of existing VBV assemblies.

Certain examples disclosed herein enable a VBV assembly in which contoured acoustic liners can be specifically tuned based on a frequency of the VBV cavity. For example, sizes (e.g., internal volumes) for different mufflers of the wall liners can be varied and adjusted based on a resonant frequency that the VBV cavity is most likely to generate. Accordingly, certain examples attenuate aero-acoustic excitation in the VBV assembly and the booster flow path, improve aerodynamic efficiency, and minimize or otherwise reduce aero-acoustic mechanical vibrations of the rotor system of the LP compressor.

Referring now to the drawings, wherein identical numerals indicate the same elements throughout the figures, FIG. 1 is a schematic cross-sectional view of an example high-bypass turbofan-type gas turbine engine ("turbofan engine 110"). While the illustrated example is a high-bypass turbofan engine, the principles of the present disclosure are also applicable to other types of engines, such as low-bypass turbofans, turbojets, turboprops, etc. As shown in FIG. 1, the turbofan engine 110 defines a longitudinal or axial centerline axis 112 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 112, the radial direction R is a direction that extends orthogonally outwardly from the centerline axis 112, and the circumferential direction C is a direction that extends concentrically around the centerline axis 112.

In general, the turbofan engine 110 includes a core turbine 114 (e.g., a gas turbine engine) disposed downstream from a fan section 116. The core turbine 114 includes a substantially tubular outer casing 118 that defines an annular inlet 120. The outer casing 118 can be formed from a single casing or multiple casings. The outer casing 118 encloses, in serial flow relationship, a compressor section having a booster or low pressure compressor 122 ("LP compressor 122") and a high pressure compressor 124 ("HP compressor 124"), a combustion section 126, a turbine section having a high pressure turbine 128 ("HP turbine 128") and a low pressure turbine 130 ("LP turbine 130"), and an exhaust section 132. A high pressure shaft or spool 134 ("HP shaft 134") drivingly couples the HP turbine 128 and the HP compressor 124. A low pressure shaft or spool 136 ("LP shaft 136") drivingly couples the LP turbine 130 and the LP compressor 122. The LP shaft 136 can also couple to a fan spool or shaft 138 of the fan section 116. In some examples, the LP shaft 136 is coupled directly to the fan shaft 138 (e.g., a direct-drive configuration). In alternative configurations, the LP shaft 136 can couple to the fan shaft 138 via a reduction gear 139 (e.g., an indirect-drive or geared-drive configuration).

As shown in FIG. 1, the fan section 116 includes a plurality of fan blades 140 coupled to and extending radially outwardly from the fan shaft 138. An annular fan casing or nacelle 142 circumferentially encloses the fan section 116 and/or at least a portion of the core turbine 114. The nacelle 142 can be supported relative to the core turbine 114 by a plurality of circumferentially spaced apart outlet guide vanes 144. Furthermore, a downstream section 146 of the nacelle 142 can enclose an outer portion of the core turbine 114 to define a bypass airflow passage 148 therebetween.

As illustrated in FIG. 1, air 150 enters an inlet portion 152 of the turbofan engine 110 during operation thereof. A first portion 154 of the air 150 flows into the bypass airflow passage 148, while a second portion 156 of the air 150 flows into the inlet 120 of the LP compressor 122. One or more sequential stages of LP compressor stator vanes 170 and LP compressor rotor blades 172 coupled to the LP shaft 136 progressively compress the second portion 156 of the air 150 flowing through the LP compressor 122 en route to the HP compressor 124. Next, one or more sequential stages of HP compressor stator vanes 174 and HP compressor rotor blades 176 coupled to the HP shaft 134 further compress the second portion 156 of the air 150 flowing through the HP compressor 124. This provides compressed air 158 to the combustion section 126 where it mixes with fuel and burns to provide combustion gases 160.

The combustion gases 160 flow through the HP turbine 128 where one or more sequential stages of HP turbine stator vanes 166 and HP turbine rotor blades 168 coupled to the HP shaft 134 extract a first portion of kinetic and/or thermal energy therefrom. This energy extraction supports operation of the HP compressor 124. The combustion gases 160 then flow through the LP turbine 130 where one or more sequential stages of LP turbine stator vanes 162 and LP turbine rotor blades 164 coupled to the LP shaft 136 extract a second portion of thermal and/or kinetic energy therefrom. This energy extraction causes the LP shaft 136 to rotate, thereby supporting operation of the LP compressor 122 and/or rotation of the fan shaft 138. The combustion gases 160 then exit the core turbine 114 through the exhaust section 132 thereof. A turbine frame 161 with a fairing assembly is located between the HP turbine 128 and the LP turbine 130. The turbine frame 161 acts as a supporting structure, connecting a high-pressure shaft's rear bearing with the turbine housing and forming an aerodynamic transition duct between the HP turbine 128 and the LP turbine 130. Fairings form a flow path between the high-pressure and low-pressure turbines and can be formed using metallic castings (e.g., nickel-based cast metallic alloys, etc.).

Along with the turbofan engine 110, the core turbine 114 serves a similar purpose and is exposed to a similar environment in land-based gas turbines, turbojet engines in which the ratio of the first portion 154 of the air 150 to the second portion 156 of the air 150 is less than that of a turbofan, and unducted fan engines in which the fan section 116 is devoid of the nacelle 142. In each of the turbofan, turbojet, and unducted engines, a speed reduction device (e.g., the reduction gear 139) can be included between any shafts and spools. For example, the reduction gear 139 is disposed between the LP shaft 136 and the fan shaft 138 of the fan section 116.

As described above with respect to FIG. 1, the turbine frame 161 is located between the HP turbine 128 and the LP turbine 130 to connect the high-pressure shaft's rear bearing with the turbine housing and form an aerodynamic transition duct between the HP turbine 128 and the LP turbine 130. As such, air flows through the turbine frame 161 between the HP turbine 128 and the LP turbine 130.

Figure 2:
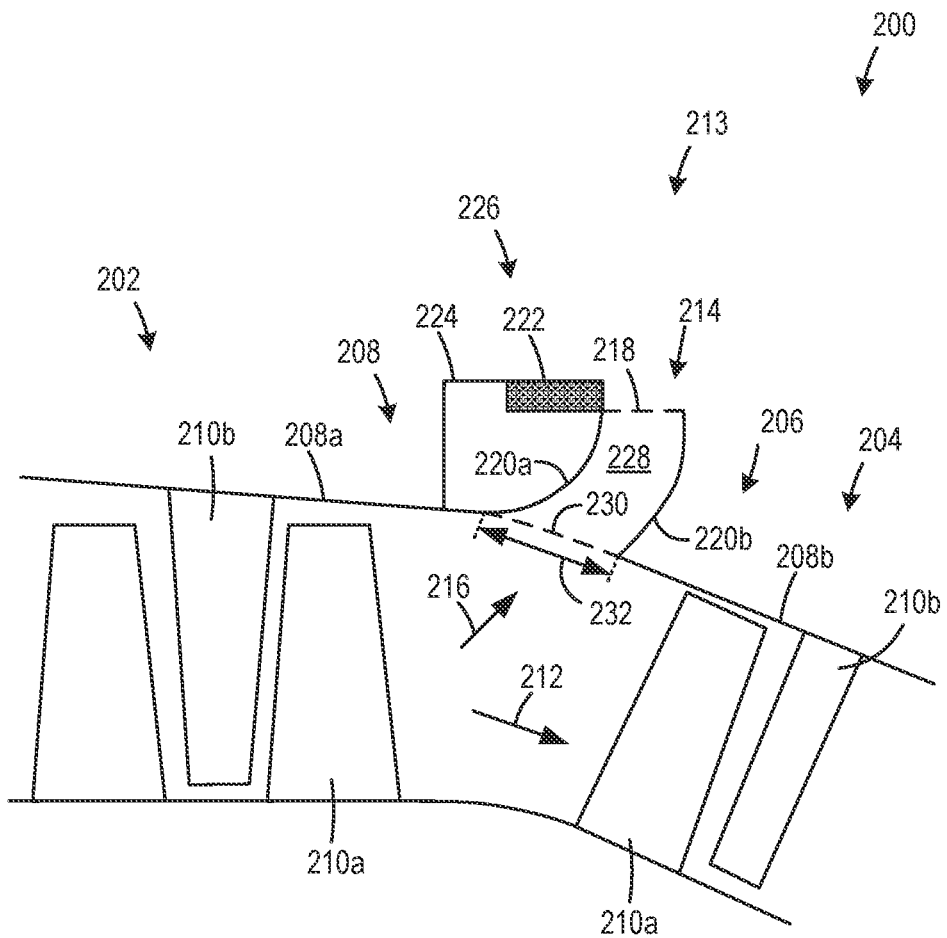
FIG. 2 is a partial cross-sectional side view of a compressor of the gas turbine engine example of FIG. 1 including a variable bleed valve assembly.

FIG. 2 is an illustration of a partial cross-sectional view of an example compressor 200 of a turbine engine (e.g., turbofan engine 110 of FIG. 1), including an example LP compressor or booster section 202 and an example HP compressor section 204. FIG. 2 illustrates the example compressor 200 at a transition point 206 between the booster section 202 and the HP compressor section 204. The compressor 200 includes an example casing 208. In the illustrated example of FIG. 2, the casing 208 surrounds the booster section 202 and the HP compressor section 204. In some examples, the booster section 202 and the HP compressor section 204 have distinct casings 208 connected via a linkage mechanism. The casing 208 surrounds rotor blades 210a and stator vanes 210b of the compressor 200. In operation, the rotor blades 210a spin, which impels air downstream. The stator vanes 210b redirect and reduce the airflow velocity, which increases the pressure downstream. The casing 208 defines an example main flow path 212 (e.g., a first flow path) for airflow through compressor 200 (e.g., and the turbofan engine 110).

As illustrated in example FIG. 2, a VBV assembly 213 of the turbine engine includes a VBV port 214 (e.g., passage, opening, duct, etc.) to divert air from the main flow path 212 and circumvent the HP compressor section 204. The VBV port 214 defines an example bleed flow path 216 (e.g., secondary flow path) between the booster section 202 and a VBV port exit 218. More specifically, the VBV port 214 includes a fore VBV wall 220a and an aft VBV wall 220b extending radially outward between the booster section 202 and the VBV port exit 218. In some examples, the fore and aft VBV walls 220a, 220b define an annular geometry of the VBV port 214.

In the illustrated example of FIG. 2, the VBV port 214 includes a VBV door 222 to restrict or permit airflow through the bleed flow path 216. The VBV assembly 213 includes a VBV actuation system 224 to actuate the VBV door 222 between an opened position 226 and a closed position. For example, the VBV actuation system 224 can include one or more levers (e.g., a bell crank, etc.), linkages, and/or other actuation device(s) to slide the VBV door 222 between the opened position 226 and the closed position. Thus, the VBV door 222 is actuatable (e.g., movable, translatable, rotatable, etc.) between the opened position 226 and the closed position.

In the illustrated example of FIG. 2, the VBV door 222 and a VBV actuation system 224 are located adjacent to the VBV port exit 218. The VBV actuation system 224 causes the VBV door 222 (e.g., blocker door, etc.) to move to the closed position to cover the VBV port exit 218. When the VBV door 222 is in the closed position, the bleed flow path 216 is blocked and air is relatively stagnant on average in the VBV port 214 compared to the main flow path 212. In some examples, the VBV door 222, the fore VBV wall 220a, and the aft VBV wall 220b of the VBV port 214 define an example VBV cavity 228 when in the VBV door 222 is in the closed position. Thus, a shear layer of airflow extending across an opening 230 of the VBV port 214 substantially confines a pocket of air within the VBV cavity 228. Air flow along the main flow path 212 and the shear layer oscillates and causes the air within the VBV cavity 228 to resonate at various frequencies. Such acoustic resonance of the VBV cavity 228 can lead to acoustic excitations in the booster section 202 and compressor instabilities. Advantageously, example VBV assemblies disclosed herein include acoustic liners to attenuate the acoustic resonance of the VBV cavity 228.

Figure 3A:
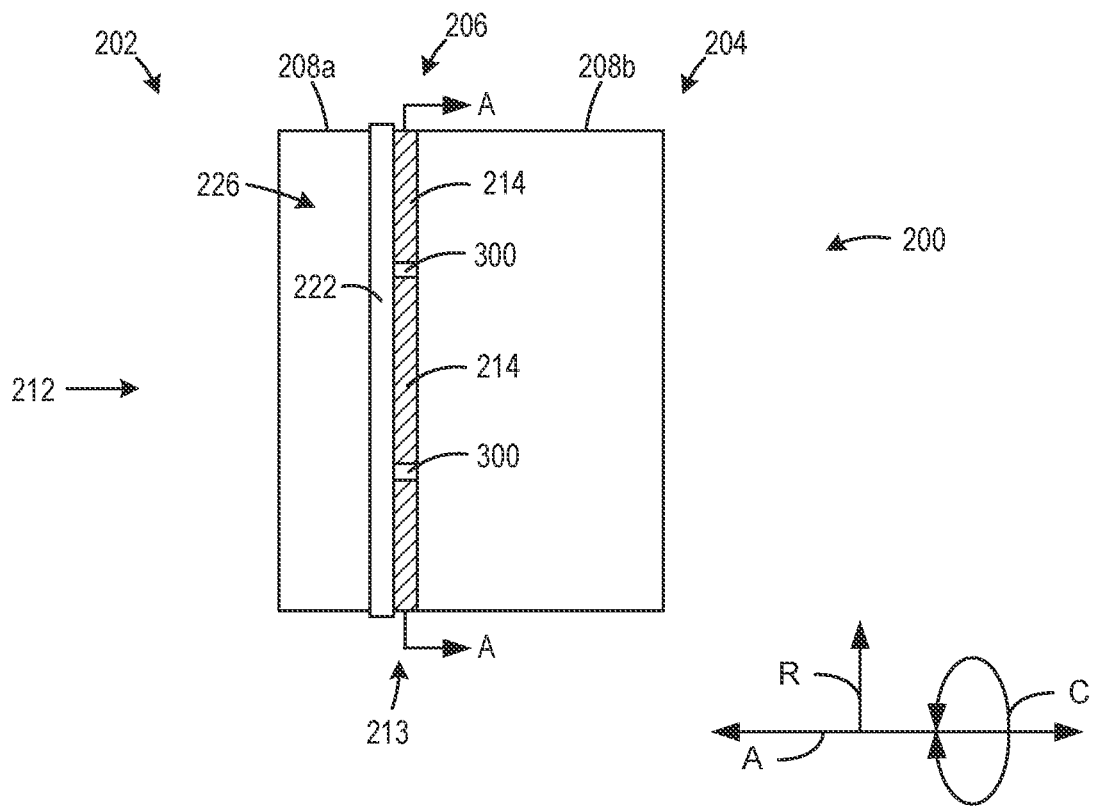
FIG. 3A is a side view of the compressor including the variable bleed valve assembly of FIG. 2.
Figure 3B:
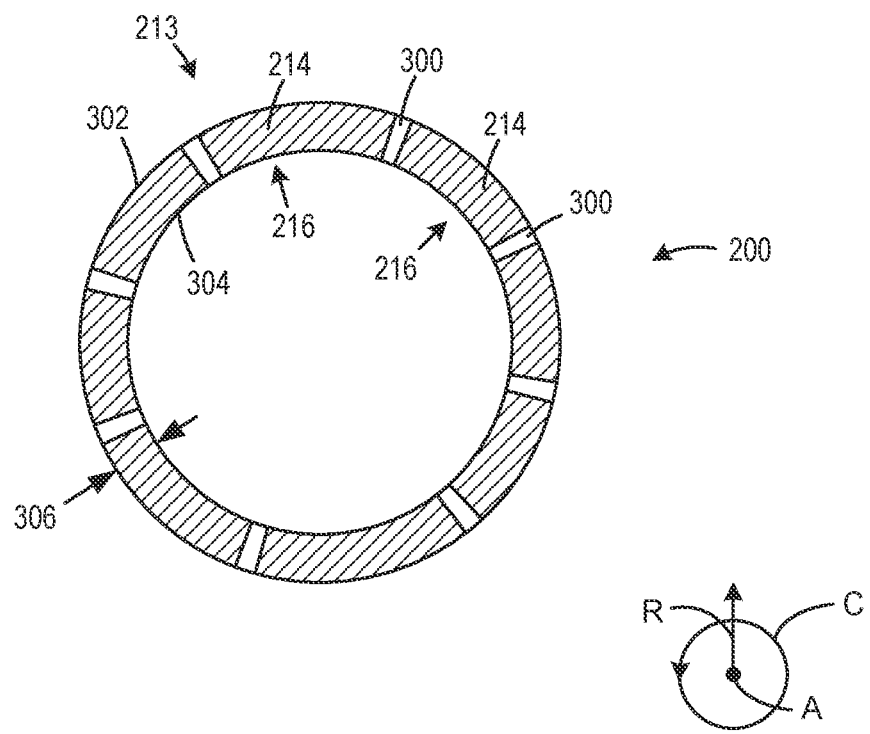
FIG. 3B is a cross-sectional front view of the compressor including the variable bleed valve assembly of FIG. 2.

FIG. 3A is a side view of the example compressor 200 of FIG. 2 including a first variable bleed valve assembly 213 that can be implemented in a turbine engine (e.g., turbofan engine 110 of FIGS. 1 and/or 2). FIG. 3B is a cross-sectional front view of the example compressor 200 of FIG. 3A taken along line A-A. In the illustrated examples, of FIGS. 3A and 3B, the VBV door 222 is in the opened position 226. Thus, the VBV door 222 is not visible in FIG. 3B.

In the illustrated examples of FIGS. 3A and 3B, a booster casing 208a surrounds the booster section 202 of the compressor 200, and a compressor casing 208b surrounds the HP compressor section 204 of the compressor 200. The booster casing 208a is coupled to the compressor casing 208b at the transition point 206. The first VBV assembly 213a includes one or more VBV ports 214 integrated into the casing 208 to bleed air from the main flow path 212. In some examples, the VBV ports 214 are formed at the transition point 206 between the booster casing 208a and the compressor casing 208b. For example, the booster casing 208a can include the fore VBV wall 220a (FIG. 2) and the compressor casing 208b can include the aft VBV wall 220b (FIG. 2). Thus, the VBV ports 214 can be created based on a coupling of the casings 208a, 208b. In some examples, the VBV ports 214 are machined into the casing 208. In some examples, an additive manufacturing process integrates the VBV ports 214 into the casing 208. Additionally or alternatively, the VBV ports 214 can be manufactured separately and coupled (e.g., brazed, welded, bolted, etc.) to the casing 208.

In some examples, the VBV assembly 213 selectively bleeds air based on a number of the VBV ports 214. For example, the casing 208 can include between 8 and 18 VBV ports 214 based on a target bleed flowrate. In some examples, respective ones of the VBV ports 214 include a door that can actuate between an open and closed position to adjust the bleed flowrate of the VBV assembly 213 based on a target bleed flowrate and/or a flight condition of the aircraft. In some examples, the VBV assembly 213 includes a single unified VBV port 214 that continually extends circumferentially about a longitudinal axis of the compressor 200 (e.g., the centerline axis 112 of FIG. 1). In the illustrated examples of FIGS. 3A and 3B, the VBV assembly 213 includes a plurality of partitions 300 to define the VBV ports 214. That is, the partitions 300 circumferentially separate adjacent ones of the VBV ports 214. The plurality of partitions 300 are spaced circumferentially about compressor 200 at a substantially similar axial and radial positions.

In the illustrated example of FIG. 3B, the booster casing 208a and the compressor casing 208b include an example outer surface 302 and an example inner surface 304. In the example of FIG. 3B, a dimension 306 of FIG. 3B corresponds to a thickness of the casings 208a, 208b and/or a radial length of the VBV ports 214. For example, the compressor casing 208b expands radially outward by the dimension 306 from the inner surface 304 to the outer surface 302. In some examples, the VBV ports 214 extend radially beyond the outer surface 302 and has a radial length that is greater than the dimension 306.

In the illustrated example of FIG. 3B, ones of the VBV ports 214 include the VBV cavity 228 of FIG. 2. In some examples, the VBV ports 214 are similarly sized and the VBV cavities 228 have similar volumes. Alternatively, ones of the VBV ports 214 can have variable sizes and ones of the VBV cavities 228 have different volumes based on respective positions of the partitions 300. However, in some examples, the VBV assembly 213 includes the single (e.g., unified, continuous, etc.) VBV port 214 such that the VBV cavity 228 extends circumferentially about the longitudinal axis of the compressor 200.

Various example VBV assemblies in accordance with the teachings of this disclosure are described in further detail below. Examples disclosed below are applied to the example compressor 200 of the example turbofan engine 110 as described in FIGS. 2, 3A, and 3B. Accordingly, examples disclosed below include the example casing 208 (e.g., the booster casing 208a and the compressor casing 208b), which defines the main flow path 212, and the example VBV port(s) 214, which defines the example bleed flow path 216. It is understood, however, that examples disclosed herein may be implemented in one or more compressors, such as a high pressure compressor, a low pressure compressor, etc. Further, examples disclosed herein may be implemented on a compressor having a variety of configurations, such as including one or more VBV ports, compressor stages, etc. Further, examples disclosed herein may be applied to a variety of turbine engines, such as a multi-spool turbine engine, a turboshaft engine, turbine engines with one compressor section, etc. Examples disclosed below may include the controller to determine to actuate the VBV assemblies disclosed herein.

The VBV ports 214 of the VBV assembly 213 of FIGS. 2, 3A, and 3B can resonate at an acoustic frequency based on the shape of the closed VBV cavity 228, including the stream wide length 232 of the opening 230, and the flow speed of the main flow path adjacent to the cavity. That is, when the VBV door 222 is in the closed position and air flows across the opening 230 (FIG. 2), the VBV port 214 of FIG. 2 resonates at the acoustic frequency, also referred to herein as the resonant frequency. Thus, the VBV assembly 213 can generate airwave oscillations in the booster section 202 of the compressor 200 that excite the mechanical components (e.g., rotor blades 210a, stator vanes 210b, etc.) of the booster section 202.

Figure 4:
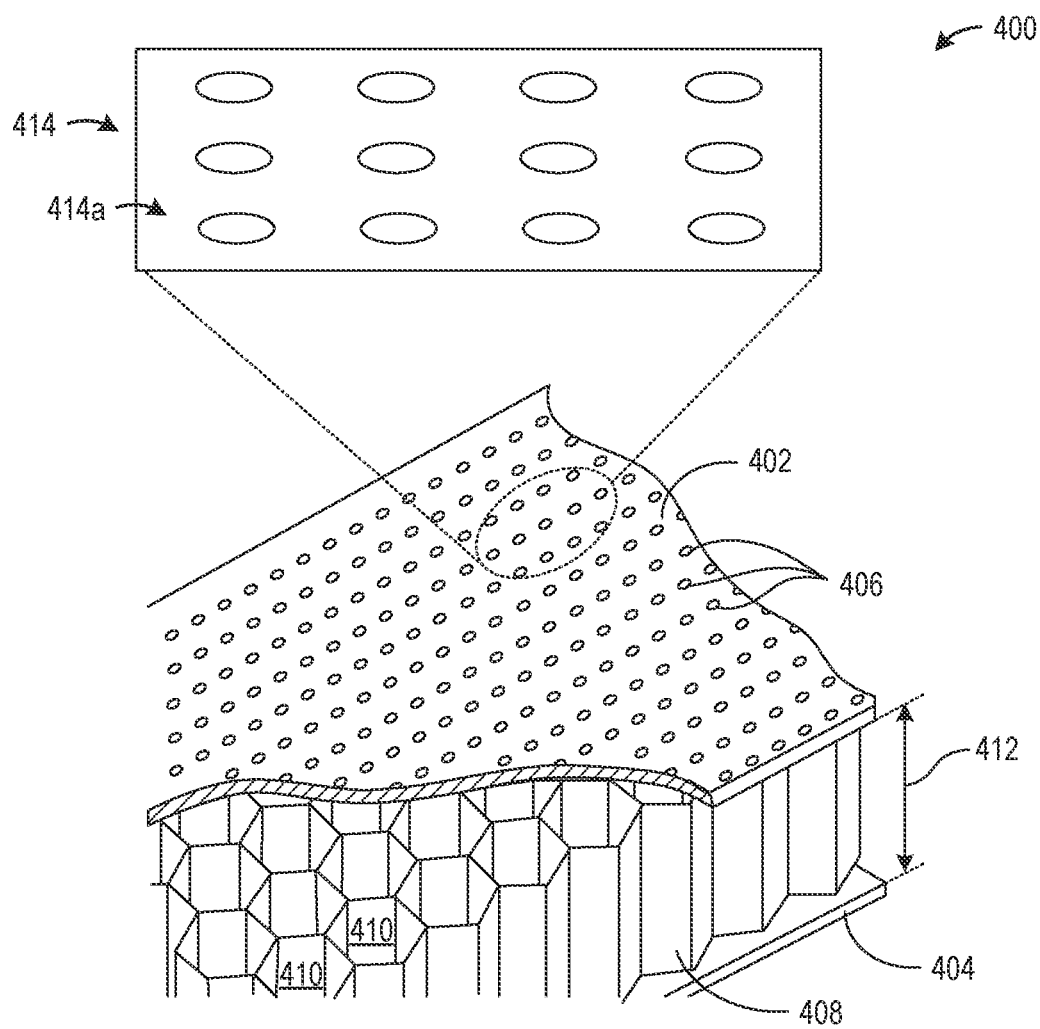
FIG. 4 is a perspective view of a known acoustic liner for the variable bleed valve assembly of FIG. 2.

FIG. 4 is a partial perspective view of a known acoustic liner 400 that can be used in some engine assemblies (e.g., in the nacelle 142 of FIG. 1, etc.) to muffle offending sound emanating from the turbofan engine 110. The acoustic liner 400 includes a first plate 402 (e.g., top plate) and a second plate 404 (e.g., bottom plate). The first plate 402 includes a plurality of perforations 406 to permit air and sound waves into the acoustic liner 400. Furthermore, the acoustic liner 400 includes a core layer 408 positioned between the first plate 402 and the second plate 404. The core layer 408 of FIG. 4 is a honeycomb core layer made of one or more materials, such as composite, aluminum, fiberglass, etc. The core layer 408 includes a plurality of chambers 410 (e.g., honeycomb cavities) extending between the first plate 402 and the second plate 404 by a dimension 412. In some examples, the dimension 412 corresponds to a depth of the chambers 410 and/or a thickness of the core layer 408, such as 1 inch, 3 inches, etc.

The acoustic liner 400 can be referred to as a quarter wave plate because the dimension 412 is a quarter of the wavelength distance associated with the frequency to be dampened. For example, when the acoustic liner 400 is to cancel noise with a frequency of 1000 Hertz (Hz) and a wavelength distance of 34 centimeters (cm), the dimension 412 of the acoustic liner 400 is approximately 8.5 cm (e.g., +/−0.1 cm, etc.). The acoustic liner 400 includes the perforations 406 to allow sound waves (e.g., air pressure fluctuations) to enter the chambers 410. The sound waves are then dampened based on the dimension 412 (e.g., depth) of the chambers 410. More specifically, the sound waves can reflect from walls of the chambers 410 to produce a resonant frequency that cancels the frequency of the sound waves entering the perforations 406. The acoustic liner 400 includes a pattern 414 of the perforations 406 corresponding to an array of circular holes, oval holes, or another shape of holes (e.g., a plurality of holes positioned in an array pattern). The shapes of the perforations 406 and/or the layout of the pattern 414 define an open area of the first plate 402. In some examples, the open area can be a primary influence on the damping characteristics of the acoustic liner 400. In the illustration of FIG. 4, the pattern 414 includes a line 414a four of the perforations 406 adjacent to one of the chambers 410.

However, a quarter wave resonant liner such as the acoustic liner 400 cannot effectively reduce or eliminate the acoustic resonance of the VBV port 214 (FIG. 2). For example, the resonant frequency of VBV ports (e.g., VBV port 214) can be associated with a wavelength distance ranging from 1 to 5 feet. Thus, the dimension 412 of the acoustic liner 400 can range from 3 to 15 inches. Thus the acoustic liner 400 with such a thickness is too thick to be integrable with the fore and aft VBV wall(s) 220a, 220b of the VBV port(s) without restricting the bleed airflow and reducing the performance of the VBV assembly 213. Thus, retrofitting the acoustic liner 400 to existing VBV ports (e.g., VBV port 214 of FIG. 2) can negatively affect the performance of the compressor 200 and the turbofan engine 110 of FIG. 1.

Figure 5:
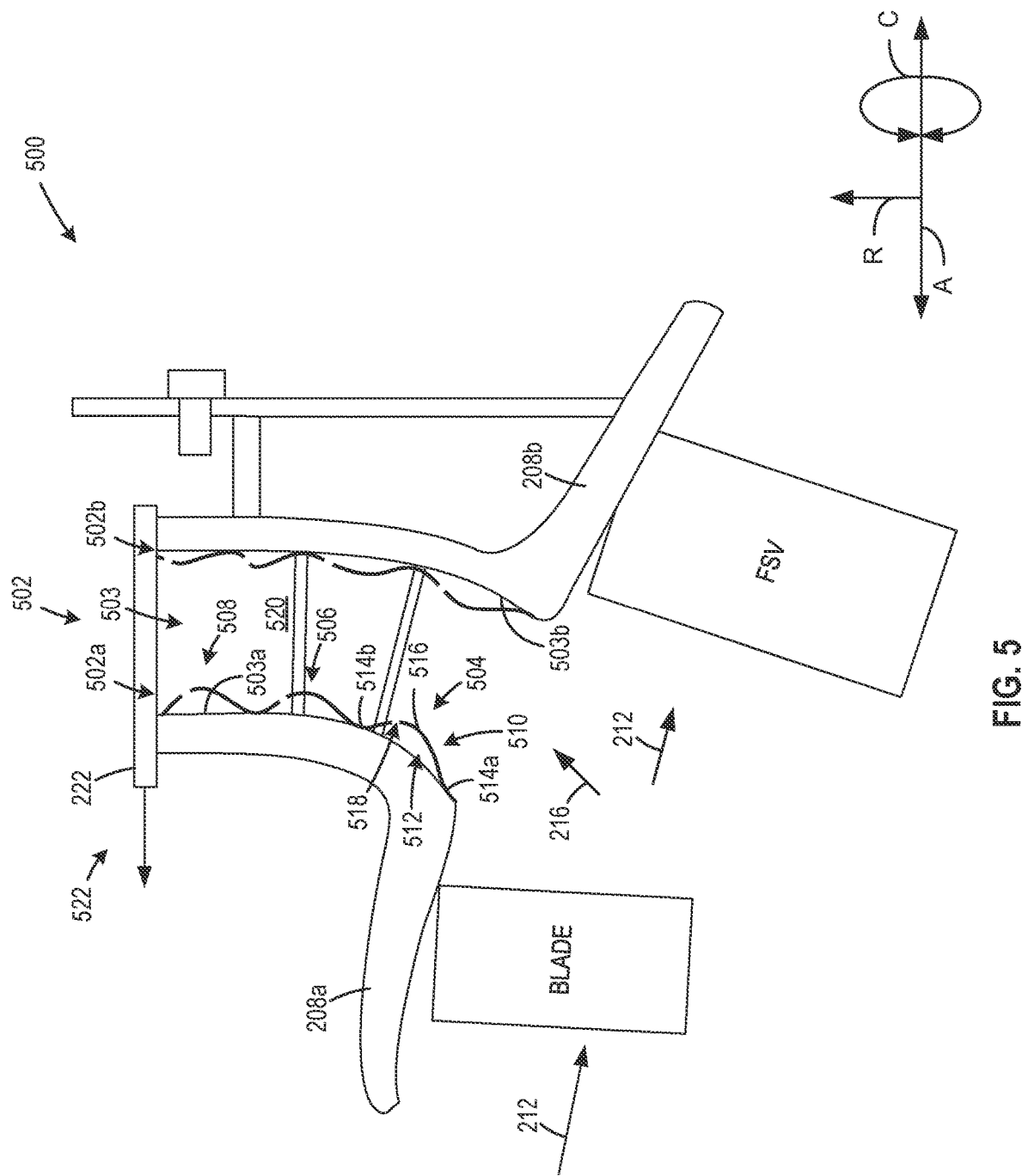
FIG. 5 is a partial cross-sectional side view of a compressor of the gas turbine engine example of FIG. 1 including a variable bleed valve assembly having acoustic resonators in accordance with teachings disclosed herein.

FIG. 5 is a cross-sectional view of an example VBV assembly 500 including an example plurality of resonators 502 (e.g., acoustic resonators and/or acoustic suppressors) in accordance with teachings disclosed herein. Many of the components of the example VBV assembly 500 of FIG. 5 are substantially similar or identical to the components described above in connection with the VBV assembly 213 of FIGS. 2, 3A, and 3B. As such, those components will not be described in detail again below. Instead, the interested reader is referred to the above corresponding descriptions for a complete written description of the structure and operation of such components. To facilitate this process, similar or identical reference numbers will be used for like structures in FIG. 5 as used in FIGS. 2, 3A, and 3B. For the figures disclosed herein, identical numerals indicate the same elements throughout the figures.

The plurality of resonators 502 includes a plurality of first resonators 502a (e.g., first plurality of acoustic suppressors and/or acoustic resonators) and a plurality of second resonators 502b (e.g., second plurality of acoustic suppressors and/or acoustic resonators). The plurality of first resonators 502a are coupled to a fore VBV wall 503a of a VBV port 503. Furthermore, the plurality of second resonators 502b are coupled to an aft VBV wall 503b of the VBV port 503. In some examples, the VBV port 503 implements the VBV port 214 of FIGS. 2, 3A, 3B. Additionally, the fore and aft VBV walls 503a, 503b of FIG. 5 can implement the fore VBV wall 220a and the aft VBV wall 220b of FIGS. 2, 3A, 3B.

In the illustrated example of FIG. 5, three of the first resonators 502a and four of the second resonators 502b are included in a VBV port 503. For example, the plurality of first resonators 502a includes a first resonator 504 (e.g., a first acoustic resonator), a second resonator 506 (e.g., a second acoustic resonator), and a third resonator 508. Alternatively, more, or fewer of the first and second resonators 502a, 502b (e.g., one, four, six, etc.) can be included in the VBV assembly 500. The plurality of first resonators 502a are coupled to a fore VBV wall 503a of the VBV port 503. Furthermore, the plurality of second resonators 502b are coupled to an aft VBV wall 503b of the VBV port 503. Descriptions of the plurality of first resonators 502a likewise apply to the plurality of second resonators 502b. Furthermore, unless otherwise specified, descriptions of the first resonator 504 can likewise apply to the other resonators (e.g., second resonator 506, third resonator 508, etc.) of FIG. 5.

In the illustrated example of FIG. 5, the VBV assembly 500 includes a contoured surface 510 coupled to the fore VBV wall 220a. The contoured surface 510 forms a resonator cavity 512 of the first resonator 504 (e.g., acoustic suppressor). The resonator cavity 512 includes a volume of air and/or damping material (e.g., bulk absorber, steel wool, etc.) between the contoured surface 510 and the fore VBV wall 220a. More specifically, the contoured surface 510 includes a first valley 514a, a second valley 514b, and a ridge 516 defining the resonator cavity 512. In some examples, the contoured surface 510 and the fore VBV wall 220a are a single unified component that are formed in the same manufacturing process. For example, the contoured surface 510, the fore VBV wall 220a, and/or a portion of the booster casing 208a can be made from a die casting process and/or an additive manufacturing process. In some examples, the contoured surface 510 is a corrugated, ridged, or fluted sheet metal coupled to the fore VBV wall 220a via fastenings, such as welding, brazing, adhesion, etc. Thus, the contoured surface 510 can be coupled to the fore VBV wall 220a at the first valley 514a, the second valley 514b, and/or other valleys of the contoured surface 510.

In the illustrated example of FIG. 5, the contoured surface 510 is wavy or corrugated to form the resonator cavity 512. Furthermore, the curvature of the contoured surface 510 reduces airflow resistance along the bleed flow path 216 when the VBV door 222 is in the opened position 226 of FIG. 2. In some examples, a cross-sectional area of the VBV port 503 is consistent along the radial direction based on the curvature of the first and second resonators 502a, 502b. In some examples, the contoured surface 510 is relatively flat and/or aligned with the fore VBV wall 220a. Thus, the first resonator 504 and the resonator cavity 512 can be defined based on partitions coupled to the contoured surface 510 and the fore VBV wall 220a (e.g., at similar positions as the first valley 514a, the second valley 514b, etc.). As described further below in connection with FIG. 6A, the contoured surface 510 extends circumferentially between adjacent ones of the partitions 300 of FIG. 3B. Thus, the first resonator 504 extends circumferentially along the fore VBV wall 220a and about the centerline axis 112 of the turbofan engine 110 of FIG. 1.

The first resonator 504 of the illustrated example of FIG. 5 includes one or more holes or perforations 518 in the contoured surface 510. In some examples, the perforations 518 are positioned between the ridge 516 and the second valley 514b (e.g., a downstream side) of the first resonator 504. The perforations 518 are positioned downstream of the ridge 516 relative to the bleed flow path 216 to reduce airflow resistance when the VBV door 222 is in the opened position 226 of FIG. 2. In some examples, additional ones of the perforations 518 are positioned between the ridge 516 and the first valley 514a (e.g., an upstream side) of the first resonator 504. In some examples, fewer of the perforations 518 are positioned upstream of the ridge 516 than are positioned downstream of the ridge 516. The perforations 518 of the illustrated example of FIG. 5 can have similar or varying shapes and/or patterns. Further descriptions of different shapes and/or patterns of the perforations 518 are provided below in connection with FIG. 7.

The perforations 518 cause the first resonator 504 to dampen sound waves present in a VBV cavity 520 (e.g., the VBV cavity 228 of FIGS. 2, 3A-3B, etc.) at a tonal or resonant frequency corresponding to the first resonator 504. When the VBV door 222 is in a closed position 522, air can circulate within the VBV cavity 520 and/or remain relatively stagnant (e.g., zero meters per second (m/s), 0.1 m/s, etc.) compared to the main flow path 212. As the VBV port 503 resonates, acoustic pressure fluctuations drive oscillating flow in and out of the resonator cavity 512 via the perforations 518. The resonant frequency of the first resonator 504 can be tuned based on volume of the resonator cavity 512, a number of the perforations 518, a shape of the perforations 518, etc. For example, increasing the volume of the resonator cavity 512 lowers the resonant frequency. Thus, the first resonator 504 can be tuned to the same frequency as the resonant frequency of the VBV port 503. When the first resonator 504 resonates at frequencies matching those of the VBV port 503, flow oscillates bidirectionally through the perforations 518 and encounters resistance that dampens the sound pressure levels associated with the VBV cavity 520 resonance. This further reduces the acoustic vibrations that exit the VBV port 503 and excite the booster section 202 of FIG. 2.

In some examples, respective ones of the resonators 502 (e.g., the first resonator 504, the second resonator 506, the third resonator 508, etc.) are tuned to the same frequency corresponding to the resonant frequency of the VBV port 503. In some examples, bulk acoustic absorbers (e.g., metallic foam, etc.) are positioned within the resonator cavity 512 near the perforations 518 to further dampen acoustic energy of the VBV port 503. In some examples, the adjacent ones of the first resonators 502a can be connected. For example, an opening can be included between the first resonator 504 and the second resonator 506 to form a combine resonator. Thus, the resonator cavity 512 can extend between the first and second resonators 504, 506. Furthermore, the combined resonator can generate a resonant frequency that is lower than the resonant frequency of the first resonator 504 alone.

Figure 6A:
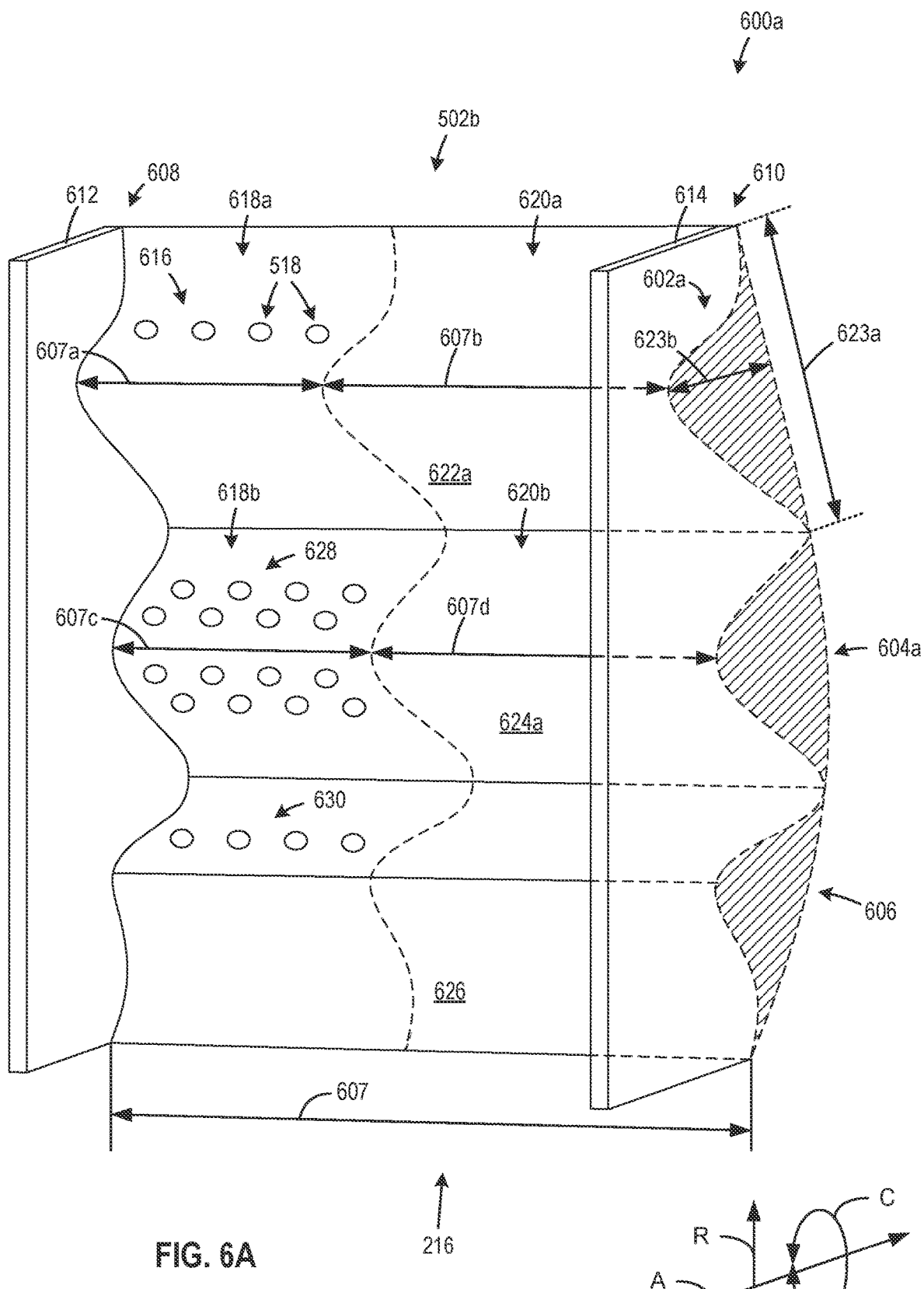
FIG. 6A is a perspective view of a section of the acoustic resonators of FIG. 5.

FIG. 6A is a perspective view of a first section 600a of the plurality of second resonators 502b of FIG. 5. In the illustrated example of FIG. 6A, three of the second resonators 502b are included in the first section 600a. For example, the plurality of second resonators 502b includes a first resonator 602a (e.g., a first acoustic resonator), a second resonator 604a (e.g., a second acoustic resonator), and a third resonator 606 (e.g., a third acoustic resonator). Unless otherwise specified, descriptions of the first resonator 602a can likewise apply to the other resonators (e.g., second resonator 604a, third resonator 606, etc.) of FIG. 6A.

The plurality of second resonators 502b extend circumferentially along a dimension 607 (e.g., a length) between a first end 608 and a second end 610. The first end 608 is positioned adjacent to a first partition 612, and the second end 610 is positioned adjacent to a second partition 614. In some examples, the second resonators 502b are coupled to the first and second partitions 612, 614 via fasteners, such as welding, brazing, etc. The first partition 612 and the second partition 614 can correspond to respective ones of the partitions 300 of FIG. 3B. Thus, the volume between the first partition 612 and the second partition 614 can correspond to the VBV cavity 228 of FIGS. 2 and 3B and/or the VBV cavity 520 of FIG. 5.

In the illustrated example of FIG. 6A, the second resonators 502b of the first section 600a are illustrated as extending between the first and second partitions 612, 614 along an approximately straight and/or orthogonal path. However, in some examples, the second resonators 502b extend circumferentially along a curved shape of a VBV port, such as the VBV port 503 of FIG. 3B. In other words, the dimension 607 of FIG. 6A corresponds to a linear length of the second resonators 502b. However, in some examples, the dimension 607 corresponds to an arcuate length of the second resonators 502b.

In the illustrated example of FIG. 6A, the first resonator 602a includes a first pattern 616 of the perforations 518. The first pattern 616 of FIG. 6A is a line of the perforations 518 positioned at a first perforated portion 618a of the first resonator 602a. By contrast, the first resonator 602a includes a first non-perforated portion 620a that is solid or uniform across a certain surface area. The first perforated portion 618a extends circumferentially along a first dimension 607a, and the first non-perforated portion 620a extends circumferentially along a second dimension 607b. In some examples, the first dimension 607a and the second dimension 607b correspond to a net length (e.g., the dimension 607) of the second resonators 502b. Furthermore, the second resonator 604a includes a second perforated portion 618b and a second non-perforated portion 620b. In the illustrated example, the second perforated portion 618b extends circumferentially along a third dimension 607c, and the second non-perforated portion 620b extends circumferentially along a fourth dimension 607d. In some examples, the first perforated portion 618a of the first resonator 602a is positioned along the first dimension 607a, and the second perforated portion 618b of the second resonator 604a is positioned along the third dimension 607c. In some examples, the third dimension 607c is different (e.g., shorter, or longer) than the first dimension 607a.

The first resonator 602a of FIG. 6A includes the first non-perforated portion 620a to reflect acoustic oscillations within a first resonant cavity 622a. The reflection of acoustic waves within the first resonant cavity 622a causes the first resonator 602a to generate an acoustic tone at a certain resonant frequency. The amount of the perforations 518 in the first pattern 616 tunes the resonant frequency of the first resonator 602a. Thus, the first and second dimensions 607a, 607b can be adjusted to tune the resonant frequency of the first resonator 602a. For example, when the first dimension 607a is increased and the first pattern 616 includes additional perforations positioned circumferentially right of the perforations 518 shown in FIG. 6A, the resonant frequency of the first resonator 602a increases.

Furthermore, a cross-sectional area of the first resonant cavity 622a can define the resonant frequency of the first resonator 602a. For example, the cross-sectional area of the first resonant cavity 622a can be increased to lower the resonant response of the first resonator 602a. Thus, the dimension 607 (e.g., second dimension 607b) and/or the cross-sectional area of the first resonator 602a (e.g., first resonant cavity 622a) can be adjusted to tune the resonant frequency of the first resonator 602a. In some examples, the cross-sectional area of the first resonator 602a and/or the first resonant cavity 622a is defined by a cross-sectional width 623a and a cross-sectional height 623b. Furthermore, the dimension 607 (e.g., length) of the first resonator 602a is greater than the cross-sectional width 623a and/or the cross-sectional height 623b of the first resonator 602a and/or the first resonant cavity 622a.

In the illustrated example of FIG. 6A, the first resonator 602a includes the first resonant cavity 622a, the second resonator 604a includes a second resonant cavity 624a, and the third resonator 606 includes a third resonant cavity 626. Furthermore, the second resonator 604a includes a second pattern 628 of the perforations 518 and the third resonator 606 includes a third pattern 630 of the perforations 518. In some examples, the first, second, and third resonators 602a, 604a, 606 have the same resonant frequency. For example, the first and second dimensions 607a, 607b of each of the first, second, and third resonators 602a, 604a, 606 can be the same, and the volumes of the first, second, and third resonant cavities 622a, 624a, . . . , 626 can be the same. Alternatively, the first dimension 607a of the first resonator 602a and the volume of the first resonant cavity 622a can be reduced to achieve a similar resonant frequency. For example, the first resonator 602a can include a partition or dividing wall within the first resonant cavity 622a to reduce the dimension 607 of the first resonator 602a.

In the illustrated example of FIG. 6A, the first pattern 616 of the first resonator 602a is similar to the third pattern 630 of the third resonator 606. The second pattern 628 of the second resonator 604a is different than the first pattern 616 and/or the third pattern 630. For example, the second pattern 628 corresponds to an array of the perforations 518 with more perforations 518 than the first pattern 616. A pattern and/or number of perforations corresponds to the open area of a resonator (e.g., quarter-wavelength resonator), and the acoustic response (e.g., acoustic impedance, acoustic resistance, acoustic reactance, etc.) of the resonator is based on the open area. Thus, the first and second resonators 602a, 604a of FIG. 6A emit a similar resonant frequency because the second dimension 607b (e.g., length of the first non-perforated portion 620a), but have different responses to the acoustic energy. For example, the second resonator 604a can provide more acoustic impedance than the first resonator 602a based on the second pattern 628. As used herein, acoustic impedance refers to a measure of the opposition that a system or damper (e.g., resonator) presents to an acoustic flow (e.g., resonating pressure oscillations) that is applied to the damper.

Figure 6B:
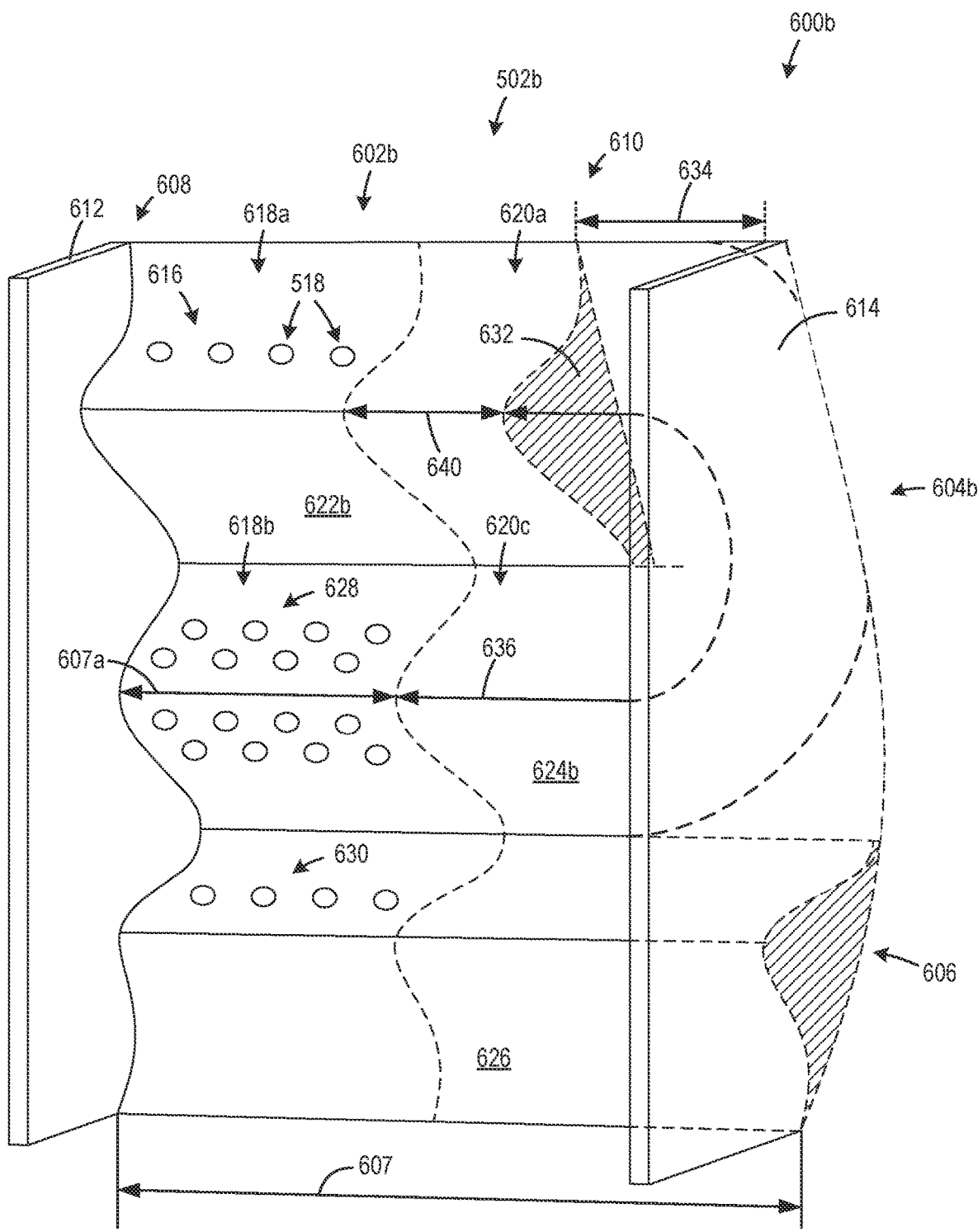
FIG. 6B is a perspective view of another section of the acoustic resonators of FIG. 5.
Figure 6C:
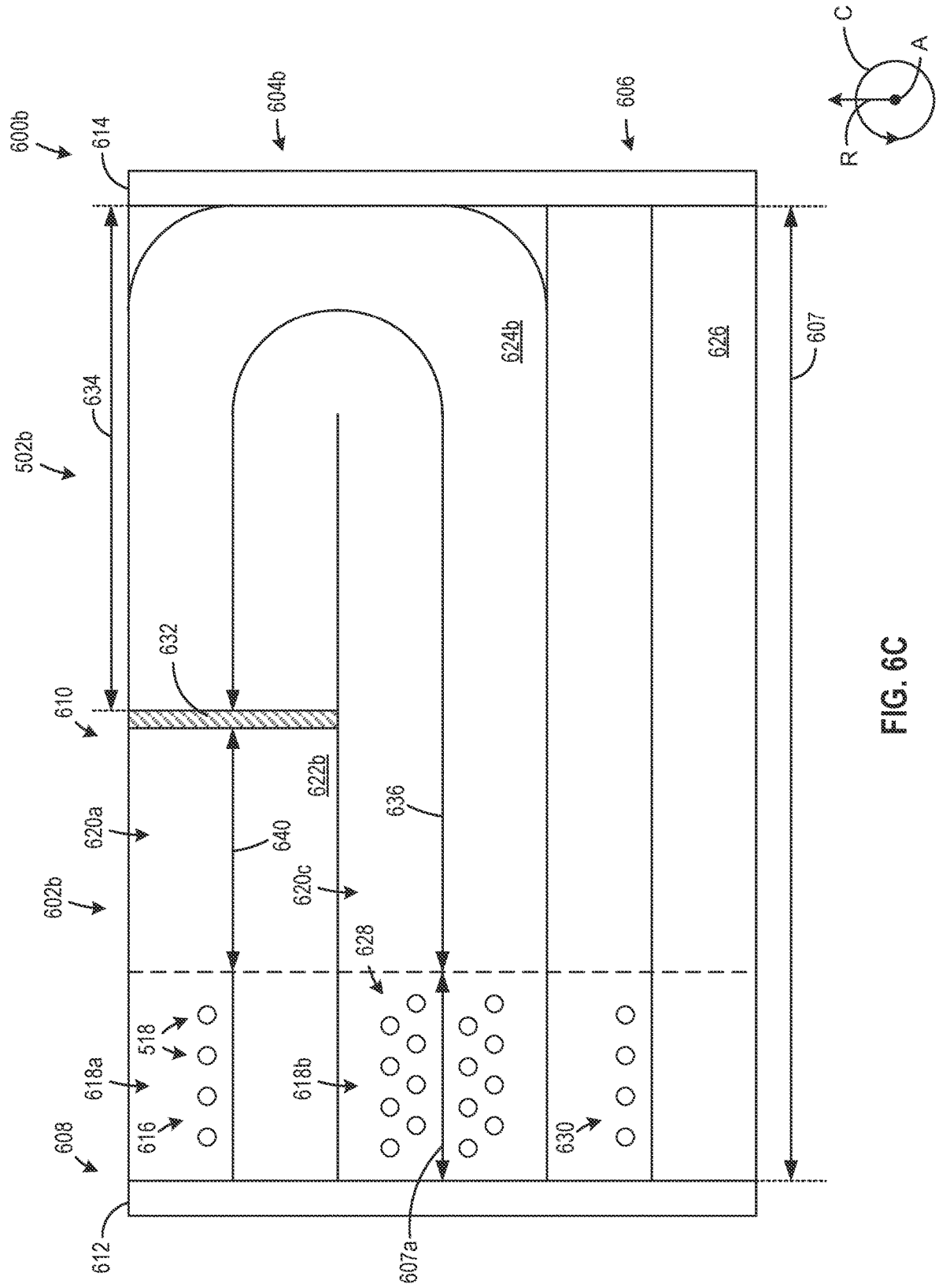
FIG. 6C is a front view of the section of FIG. 6B.
Figure 6D:
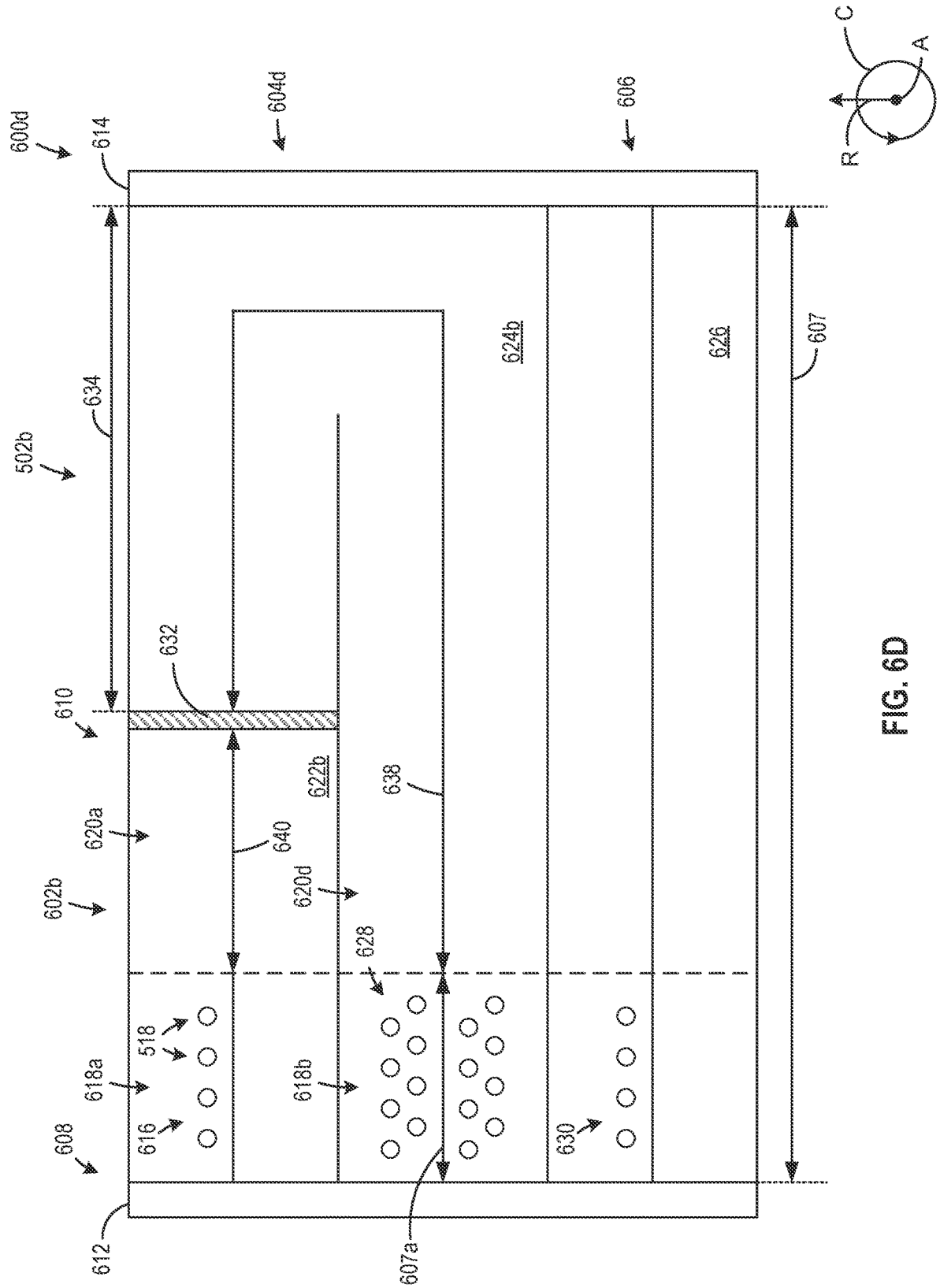
FIG. 6D is a front view of another section of the acoustic resonators of FIG. 5.

FIG. 6B is a perspective view of a second section 600b of the plurality of second resonators 502b of FIG. 5. FIG. 6C is a front view of the second section 600b of FIG. 6B. FIG. 6D is a front view of a third section 600d of the plurality of second resonators 502b of FIG. 5. In the illustrated examples of FIGS. 6B-6D, three of the second resonators 502b are included in the second and third sections 600b, 600d. For example, the plurality of second resonators 502b of FIGS. 6B and 6C includes a fourth resonator 602b, a fifth resonator 604b, and the third resonator 606 (FIG. 6A). The plurality of second resonators 502b of FIG. 6D includes the fourth resonator 602b, a sixth resonator 604d, and the third resonator 606 (FIG. 6A).

In the illustrated example of FIGS. 6B-6D, adjacent ones of the second resonators 502b are connected to reduce the resonant frequency. For example, the second end 610 of the fifth resonator 604b can be curved and coupled to the second end 610 of the fourth resonator 602b. Thus, a fourth resonant cavity 622b of the fourth resonator 602b and a fifth resonant cavity 624b of the fifth resonator 604b can be connected to define a continuous space or volume within which acoustic oscillations can freely transmit. Alternatively, as illustrated in FIG. 6D, the second end 610 of the sixth resonator 604d can have approximately 90-degree turns to couple to the second end 610 of the fourth resonator 602b.

In the illustrated example of FIGS. 6B and 6C, a partition or dividing wall 632 is positioned at the second end 610 of the first resonator 602a and the second end 610 of the second resonator 604a to separate the fourth and fifth resonant cavities 622b, 624b. The dividing wall 632 is positioned at a distance 634 from the second partition 614 to provide a curved length 636 for a third non-perforated portion 620c of the fifth resonator 604b. The curved length 636 is longer than the second dimension 607b of the third resonator 606, which enables absorption at lower frequency (e.g., relative to the third resonator 606).

In the illustrated example of FIG. 6D, the sixth resonator 604d is angled at approximately 90-degree angles adjacent to the second partition 614. Thus, the sixth resonator 604d is rectangularly shaped. Furthermore, a fourth non-perforated portion 620d of the sixth resonator 604d extends and bends along a length 638 (e.g., rectangular length, orthogonal length, etc.) between the second perforated portion 618b and the dividing wall 632. The length 638 is longer than the curved length of the fifth resonator 604b of FIGS. 6B and 6C. Thus, the sixth resonator 604d can dampen a lower frequency than that of the fifth resonator 604b.

In the illustrated examples of FIGS. 6B-6D, the dividing wall 632 defines a length 640 of the third non-perforated portion 620c of the fourth resonator 602b, which tunes the fourth resonator 602b to a higher frequency (e.g., relative to the fifth resonator 604b and the third resonator 606). Thus, the length 640 enables the fourth resonator 602b to absorb higher modes (e.g., eigenmodes) that correspond to higher resonant frequencies. Furthermore, successive pairs of resonators can be coupled together to allow the second resonators 502b to dampen multiple potential resonant frequencies of interest for a specific application (e.g., multiple VBV resonant modes at a given operating engine condition, and/or multiple operating conditions, such as takeoff, climb, landing, cruise, etc.).

In some examples, the first end 608 of the fifth resonator 604b and the first end 608 of the third resonator 606 are also coupled together. Further, the second pattern 628 of the fifth resonator 604b is removed, and the third pattern 630 of the third resonator 606 is repositioned to the second end 610. Further still, the dividing wall 632 is removed or repositioned to the third resonator 606. Thus, the fourth, fifth, and third resonant cavities 622b, 624b, 626 can form a pair of resonators with one having a continuous "S" shaped volume, which attains even lower frequencies than described above. In such examples, the resonant frequency attained can be between one-third and one-half of the resonant frequency of the first, second, or third resonator 602a, 604a, or 606 of FIG. 6A individually because the volume of the resonant length of the resonant cavity can be doubled or tripled.

Figure 7:
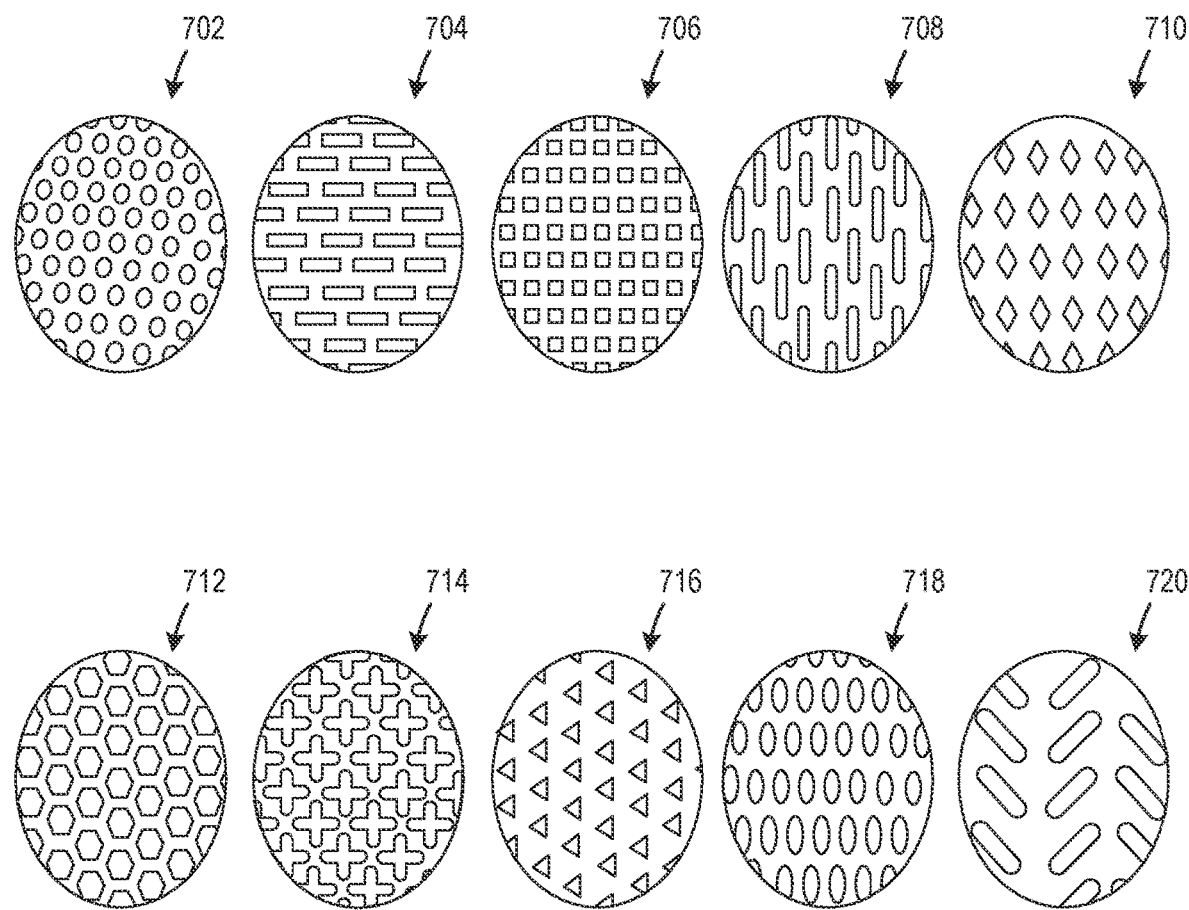
FIG. 7 are partial front views of various perforation shapes and patterns that the acoustic resonators of FIGS. 5 and 6A-6D can implement.

FIG. 7 are partial front views of other example shapes and/or patterns of perforations that can implement the perforations 518 of the plurality of resonators 502 of FIGS. 5, 6A-6D. The illustrated example of FIG. 7 includes round perforations 702, rectangular perforations 704, square perforations 706, straight slot perforations 708, diamond perforations 710, hexagonal perforations 712, cross perforations 714, triangular perforations 716, oval perforations 718, and angled slot perforations 720. In some examples, implementation of different ones of the perforations 702-720 can provide different acoustic resistance characteristics of the resonators 502. As used herein, acoustic resistance refers to the energy transfer of an acoustic wave between the VBV cavity 520 and the resonator cavity 512 of FIG. 5. The acoustic resistance of the first resonator 504 of FIG. 5 can affect the amount of acoustic energy the liner is able to absorb. Thus, the increasing the resistance of the first resonator 504 can reduce the sound pressure levels associated with the acoustic oscillations from the VBV port 503 based on the resonant frequency of the VBV port 503, the reactance of the first resonator 504, and/or the percent open area that the perforation pattern provides.

In some examples, one of the perforations 702-720 are implemented as the perforations 518 based on a target acoustic resistance of the associated resonator (e.g., the first resonator 504). In some examples, a surface area of a non-perforated portion (e.g., the first non-perforated portion 620a FIG. 6A) of the resonator is selected based on a target acoustic reactance (e.g., resonant frequency) of the resonator. For example, the cross perforations 714 can be implemented in the first resonator 504 to attain a desired open area of the perforations 518 in a reduced surface area because of the tighter packing possible with these perforation shapes, which correspondingly allows for slightly lower frequencies associated with the resonators (because the distance of the perforations from the ends (608 or 610) is reduced). As such, a tradeoff exists between acoustic resistance and acoustic reactance of the resonators 502 of FIG. 5 based on the ones of the perforations 702-720 that implement the perforations 518 of FIGS. 5 and 6A-6D. For example, for a nominally 250 Hz resonator, the first non-perforated portion 620a of FIG. 6A can cover 50% of the length of the first resonator 602a to produce a resonant frequency of 500 Hz. In another example, the first non-perforated portion 620a can cover 80% of the length of the first resonator 602a to produce a resonant frequency of approximately 315 Hz.

Example VBV assemblies are disclosed herein that include VBV ports having acoustic resonators coupled to walls of VBV ports. The acoustic resonators include a wavy and/or corrugated sheet defining passages or cavities extending in circumferential and radial directions. Thus, the acoustic resonators can be arcuate ridges with variable or consistent (e.g., identical, or similar, such as with +/−10 percent, etc.) interior volumes. Example acoustic resonators disclosed herein include pattern(s) of perforations on one or both sides (e.g., upstream, or downstream sides) relative to a ridge of the acoustic resonators, and/or at the crests of the corrugated shape. In some examples, the patterns includes a line, an array, a cross pattern, and/or a triangular pattern of the perforations. The interior volume, the number of the perforations, and/or the pattern of the perforations can be adjusted to tune the absorption characteristics of the liner at the desired resonant VBV cavity frequencies of interest. Furthermore, the pattern and/or the shape of the perforations (e.g., round, oval, triangular, square, etc.) can be variable to adjust the acoustic resistance characteristics of the disclosed acoustic resonators herein.

Example acoustic resonators disclosed herein dissipate or dampen acoustic oscillations of a VBV port that propagate into a compressor. Acoustic energy from the resonance of the VBV port can crack, dislodge, or otherwise damage stages or components (e.g., rotor blisk, stator vane, rotor blade, etc.) of a booster section of the compressor. Disclosed VBV assemblies include example acoustic suppressors that attenuate the frequencies dominating the VBV cavity response, to thereby mitigate, reduce, or eliminate mechanical excitement of the booster section. Thus, example acoustic liners disclosed herein abate acoustic energy from resonating VBV ports to reduce damage and improve performance a gas turbine engine.

Example methods, apparatus, systems, and articles of manufacture to dissipate or dampen acoustic oscillations of a VBV assembly are disclosed herein. Further examples and combinations thereof include the following:

A variable bleed valve assembly for a gas turbine engine, comprising a port extending radially outward from a compressor section of the gas turbine engine, the port defining a variable bleed valve cavity, the port to resonate at a resonant frequency based on an operating condition of the gas turbine engine, and an acoustic suppressor positioned on a wall of the port, the acoustic suppressor extending circumferentially along the wall by a length greater than a cross-sectional width of the acoustic suppressor, the acoustic suppressor defining a resonant cavity based on the length and the cross-sectional width, the acoustic suppressor including a perforated portion, the acoustic suppressor tuned to resonate at the resonant frequency based on the length and the perforated portion.

The variable bleed valve assembly of any preceding clause, wherein the acoustic suppressor is a first acoustic resonator, and the resonant cavity is a first resonant cavity, further including a second acoustic resonator positioned on the wall adjacent to the first acoustic resonator, the second acoustic resonator including a second resonant cavity.

The variable bleed valve assembly of any preceding clause, wherein the first acoustic resonator is coupled to the second acoustic resonator, further including a dividing wall positioned between the first resonant cavity and the second resonant cavity.

The variable bleed valve assembly of any preceding clause, wherein the second acoustic resonator extends along a curved length, the length of the first acoustic resonator different than the curved length.

The variable bleed valve assembly of any preceding clause, wherein the perforated portion of the first acoustic resonator is a first perforated portion positioned along a first dimension, the second acoustic resonator including a second perforated portion positioned along a second dimension different than the first dimension.

The variable bleed valve assembly of any preceding clause, wherein the acoustic suppressor is a first acoustic resonator, further including a contoured surface defining a plurality of acoustic resonators including the first acoustic resonator.

The variable bleed valve assembly of any preceding clause, wherein the contoured surface is coupled to the wall of the port.

The variable bleed valve assembly of any preceding clause, wherein the contoured surface and the wall of the port are a single unified part.

The variable bleed valve assembly of any preceding clause, wherein the acoustic suppressor includes ridge positioned between a first valley and a second valley, the first valley upstream of the second valley relative to a bleed flow path of the port, the perforated portion positioned between the ridge and the second valley.

The variable bleed valve assembly of any preceding clause, wherein the perforated portion includes a plurality of circular holes positioned in an array pattern.

A gas turbine engine, comprising a compressor section, and a variable bleed valve including a door actuatable between a closed position and an opened position, a port having a first wall and a second wall extending radially outward between the compressor section and the door, the first wall and the second wall defining a cavity and a bleed flow path between the compressor section and the door, a first plurality of acoustic suppressors coupled to the first wall, and a second plurality of acoustic suppressors coupled to the second wall.

The gas turbine engine of any preceding clause, wherein the port, the first plurality of acoustic suppressors, and the second plurality of acoustic suppressors extend circumferentially between a first partition and a second partition.

The gas turbine engine of any preceding clause, wherein the first plurality of acoustic suppressors includes a first acoustic resonator and a second acoustic resonator, the first and second acoustic resonators tuned to a resonant frequency.

The gas turbine engine of any preceding clause, wherein the first plurality of acoustic suppressors includes a first acoustic resonator and a second acoustic resonator, the first acoustic resonator tuned to a first resonant frequency, the second acoustic resonator tuned to a second resonant frequency different than the first resonant frequency.

The gas turbine engine of any preceding clause, wherein the first acoustic resonator includes a first perforated portion and a first non-perforated portion, and the second acoustic resonator includes a second perforated portion and a second non-perforated portion, a length of the second non-perforated portion different than a length of the first non-perforated portion.

The gas turbine engine of any preceding clause, wherein the first acoustic resonator includes a first pattern of perforations, the second acoustic resonator including a second pattern of perforations different than the first pattern of perforations.

An aircraft, comprising a gas turbine engine including a booster section and a high-pressure compressor section, and a variable bleed valve assembly positioned between the booster section and the high-pressure compressor section, the variable bleed valve assembly including a port defining a bleed flow path, and a first acoustic resonator coupled to a wall of the port, the first acoustic resonator including a ridge and a plurality of perforations, the ridge defining a resonant cavity.

The aircraft of any preceding clause, including a contoured surface coupled to the wall of the port, the contoured surface including a first valley, a second valley, and the ridge defining the first acoustic resonator, the first valley positioned downstream of the ridge and the second valley positioned upstream of the ridge relative to the bleed flow path.

The aircraft of any preceding clause, wherein the plurality of perforations is positioned between the ridge and the second valley.

The aircraft of any preceding clause, wherein the plurality of perforations is a first plurality of perforations positioned between the first valley and the ridge, further including a second plurality of perforations positioned between the ridge and the second valley.

Although certain example systems, apparatus, and articles of manufacture have been disclosed herein, the scope of coverage of this patent is not limited thereto. On the contrary, this patent covers all systems, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. A variable bleed valve assembly for a gas turbine engine, comprising:
    a port extending radially outward from a compressor section of the gas turbine engine, the port defining a variable bleed valve cavity, the port to resonate at a resonant frequency based on an operating condition of the gas turbine engine, the port including a wall; and
    a first partition extending from the wall;
    a second partition extending from the wall; and
    an acoustic suppressor positioned on the wall of the port, the acoustic suppressor having a length extending along the wall, the length extending between the first partition and the second partition, the length greater than a cross-sectional width of the acoustic suppressor, the acoustic suppressor defining a resonant cavity based on the length and the cross-sectional width, the acoustic suppressor including a perforated portion positioned along a first dimension of the length and a non-perforated portion positioned along a second dimension of the length, the acoustic suppressor tuned to resonate at the resonant frequency based on the length and the perforated portion, a sum of the first dimension and the second dimension equal to the length.

2. The variable bleed valve assembly of claim 1, wherein the acoustic suppressor is a first acoustic resonator, and the resonant cavity is a first resonant cavity, further including a second acoustic resonator positioned on the wall adjacent to the first acoustic resonator, the second acoustic resonator including a second resonant cavity.

3. The variable bleed valve assembly of claim 2, wherein the first acoustic resonator is coupled to the second acoustic resonator, further including a dividing wall positioned between the first resonant cavity and the second resonant cavity.

4. The variable bleed valve assembly of claim 3, wherein the second acoustic resonator extends along a curved length, the length of the first acoustic resonator different than the curved length, the curved length having a component parallel to a radial axis of the gas turbine engine.

5. The variable bleed valve assembly of claim 2, the second acoustic resonator including a second perforated portion positioned along a third dimension different than the first dimension.

6. The variable bleed valve assembly of claim 1, wherein the acoustic suppressor is a first acoustic resonator, further including a contoured surface defining a plurality of acoustic resonators including the first acoustic resonator.

7. The variable bleed valve assembly of claim 6, wherein the contoured surface is coupled to the wall of the port.

8. The variable bleed valve assembly of claim 6, wherein the contoured surface and the wall of the port are a single unified part.

9. The variable bleed valve assembly of claim 1, wherein the acoustic suppressor includes a ridge positioned between a first valley and a second valley, the first valley upstream of the second valley relative to a bleed flow path of the port, the perforated portion positioned between the ridge and the second valley.

10. The variable bleed valve assembly of claim 9, wherein the perforated portion includes a plurality of circular holes positioned in an array pattern.

11. A gas turbine engine, comprising:
a compressor section; and
a variable bleed valve including:
a door actuatable between a closed position and an opened position;
a port having a first wall and a second wall extending radially outward between the compressor section and the door, the first wall and the second wall defining a cavity and a bleed flow path between the compressor section and the door;
a first partition extending from the first wall; and
a second partition extending from the first wall;
a first plurality of acoustic suppressors coupled to the first wall, the first plurality of acoustic suppressors including an acoustic resonator having a length extending along the first wall, the length extending between the first partition and the second partition, the acoustic resonator including a perforated portion positioned along a first dimension of the length and a non-perforated portion positioned along a second dimension of the length, a sum of the first dimension and the second dimension equal to the length; and
a second plurality of acoustic suppressors coupled to the second wall.

12. The gas turbine engine of claim 11, wherein the acoustic resonator is a first acoustic resonator, the first plurality of acoustic suppressors further includes and a second acoustic resonator, the first acoustic resonator and the second acoustic resonators tuned to a resonant frequency.

13. The gas turbine engine of claim 11, wherein the acoustic resonator is a first acoustic resonator, the first plurality of acoustic suppressors further includes and a second acoustic resonator, the first acoustic resonator tuned to a first resonant frequency, the second acoustic resonator tuned to a second resonant frequency different than the first resonant frequency.

14. The gas turbine engine of claim 13, wherein the the perforated portion is a first perforated portion, the non-perforated portion is a first non-perforated portion, and the second acoustic resonator includes a second perforated portion positioned along the first dimension and a second non-perforated portion positioned along a curved length, the curved length greater than the second dimension and the first dimension.

15. The gas turbine engine of claim 13, wherein the first acoustic resonator includes a first pattern of perforations, the second acoustic resonator including a second pattern of perforations different than the first pattern of perforations.

16. An aircraft, comprising:
a gas turbine engine including a booster section and a high-pressure compressor section; and
a variable bleed valve assembly positioned between the booster section and the high-pressure compressor section, the variable bleed valve assembly including:
a port defining a bleed flow path, the port including a wall;
a first partition extending from the wall;
a second partition extending from the wall; and
a acoustic resonator coupled to the wall of the port, the acoustic resonator including a ridge and a plurality of perforations, the ridge defining a resonant cavity, the acoustic resonator having a length extending along the wall, the length extending between the first partition and the second partition, the acoustic resonator including a perforated portion positioned along a first dimension of the length and a non-perforated portion positioned along a second dimension of the length, a sum of the first dimension and the second dimension equal to the length.

17. The aircraft of claim 16, including a contoured surface coupled to the wall of the port, the contoured surface including a first valley, a second valley, and the ridge defining the acoustic resonator, the first valley positioned downstream of the ridge and the second valley positioned upstream of the ridge relative to the bleed flow path.

18. The aircraft of claim 17, wherein the plurality of perforations is positioned between the ridge and the second valley.

19. The aircraft of claim 17, wherein the plurality of perforations is a first plurality of perforations positioned between the first valley and the ridge, further including a second plurality of perforations positioned between the ridge and the second valley.

20. The aircraft of claim 17, wherein the length includes at least two 90 degree turns.

* * * * *

UNITED STATES PATENT AND TRADEMARK OFFICE
CERTIFICATE OF CORRECTION

PATENT NO. : 12,180,890 B1
APPLICATION NO. : 18/454531
DATED : December 31, 2024
INVENTOR(S) : Ganji et al.

Page 1 of 1

It is certified that error appears in the above-identified patent and that said Letters Patent is hereby corrected as shown below:

In the Claims

Column 19, Claim 12, Line 51, Delete "and".

Column 20, Claim 13, Line 1, Delete "and".

Column 20, Claim 14, Line 6, Delete "the".

Signed and Sealed this
Twelfth Day of August, 2025

Coke Morgan Stewart
*Acting Director of the United States Patent and Trademark Office*